United States Patent
Hertz et al.

(10) Patent No.: US 9,534,654 B2
(45) Date of Patent: Jan. 3, 2017

(54) VIBRATION DAMPER WITH A CLAMP-SHAPED ATTACHMENT PART

(71) Applicants: Wolfgang Hertz, Sankt Augustin (DE); Klaus Schreiner, Windeck (DE)

(72) Inventors: Wolfgang Hertz, Sankt Augustin (DE); Klaus Schreiner, Windeck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 139 days.

(21) Appl. No.: 14/205,976

(22) Filed: Mar. 12, 2014

(65) Prior Publication Data

US 2014/0291084 A1 Oct. 2, 2014

(30) Foreign Application Priority Data

Mar. 27, 2013 (DE) ........................ 10 2013 205 400

(51) Int. Cl.
*F16F 9/00* (2006.01)
*F16F 9/54* (2006.01)
*B60G 21/055* (2006.01)

(52) U.S. Cl.
CPC ............. *F16F 9/54* (2013.01); *B60G 21/0551* (2013.01); *B60G 2202/312* (2013.01); *B60G 2204/1224* (2013.01); *B60G 2204/20* (2013.01); *B60G 2204/43* (2013.01); *B60G 2204/4305* (2013.01); *B60G 2206/41* (2013.01); *B60G 2206/722* (2013.01); *F16F 2230/0005* (2013.01)

(58) Field of Classification Search
CPC ............................ F16F 9/54; F16F 2230/0005
USPC . 403/192, 193, 195, 196, 395; 280/124.154, 280/124.155, 124.45, 124.146, 124.147; 188/192, 193, 195, 196, 395
See application file for complete search history.

(56) References Cited

U.S. PATENT DOCUMENTS

| | | | | |
|---|---|---|---|---|
| 3,189,961 A | * | 6/1965 | Heller | F16L 33/035 24/20 CW |
| 3,544,137 A | * | 12/1970 | Contreras | F16L 27/04 285/261 |
| 4,402,113 A | * | 9/1983 | Smith | F16L 33/02 24/20 R |
| 4,491,339 A | * | 1/1985 | Mizumukai | B60G 13/006 188/321.11 |
| 4,577,534 A | * | 3/1986 | Rayne | B25B 27/0035 280/86.755 |

(Continued)

FOREIGN PATENT DOCUMENTS

| | | |
|---|---|---|
| DE | 10122794 | 11/2002 |
| DE | 202005001844 | 3/2005 |
| DE | 102006018802 | 12/2006 |
| DE | 102009000370 | 8/2009 |
| DE | 102009000164 | 7/2010 |
| DE | 102009001256 | 9/2010 |

OTHER PUBLICATIONS

Machine translation of DE 10 2009 000164 (no date).*
Machine Translation of DE 101 22 794 (no date).*

*Primary Examiner* — Nicholas J Lane
(74) *Attorney, Agent, or Firm* — Cozen O'Connor

(57) ABSTRACT

A vibration damper includes a cylinder to which a clamp-shaped attachment part is fastened, wherein the attachment part has a tubular body which contacts an outer lateral surface of the cylinder and has at both ends thereof radial tabs which are spaced apart in circumferential direction and by which a pre-loading in circumferential direction is introduced in the tubular body by clamping devices, wherein the tubular body has an elongation portion oriented in circumferential direction of the lateral surface of the cylinder.

2 Claims, 4 Drawing Sheets

(56) References Cited

U.S. PATENT DOCUMENTS

| | | | | |
|---|---|---|---|---|
| 4,907,319 | A * | 3/1990 | Calmettes | F16L 33/035 24/20 CW |
| 4,930,803 | A * | 6/1990 | Handke | B60G 13/006 267/221 |
| 4,987,651 | A * | 1/1991 | Oetiker | F16L 33/035 24/20 CW |
| 5,064,157 | A * | 11/1991 | O'Neal | B62K 21/12 248/230.1 |
| 5,607,035 | A * | 3/1997 | Fulks | B60G 13/006 188/322.19 |
| 5,613,281 | A * | 3/1997 | Oetiker | F16L 33/025 24/20 R |
| 5,669,728 | A * | 9/1997 | Koba | B60G 15/07 188/322.19 |
| 6,367,751 | B1 * | 4/2002 | Perrott | B60G 13/005 248/218.4 |
| 6,692,012 | B2 * | 2/2004 | Fullenkamp | B60G 15/063 267/179 |
| 7,389,568 | B2 * | 6/2008 | Crockett, IV | F16L 33/08 24/20 R |
| 7,581,753 | B2 * | 9/2009 | Meier | B60R 21/217 24/20 CW |
| 7,631,908 | B2 * | 12/2009 | Meier | B60R 21/2171 24/20 CW |
| 2011/0085848 | A1 * | 4/2011 | Kim | B60G 21/055 403/187 |

* cited by examiner

VIBRATION DAMPER WITH A CLAMP-SHAPED ATTACHMENT PART

FIELD OF THE INVENTION

The present invention is directed to a vibration damper with a clamp-shaped attachment part.

BACKGROUND OF THE INVENTION

A vibration damper to which a clamp-shaped attachment part is fastened is known from DE 10 2009 001 256 A1. The vibration damper comprises a cylinder with a circular cross section. The clamp-shaped attachment part is arranged on a lateral surface of the cylinder. In unclamped condition of the attachment part, two radial tabs form a gap with an acute angle. When a predetermined clamping force is applied by means of clamping screws, the two tabs move together so that the angle decreases. In a tubular body of the attachment part, a clamping is applied in circumferential direction of the tubular body by this clamping movement of the tabs. This clamping provides for a retaining force of the attachment part at the cylinder. An additional expansion of the diameter of the cylinder for axial support of the attachment part is unnecessary in this case.

A basic problem exists in that the uneven clamping distribution between tubular body and cylinder leads to clamping peaks which may exceed strength values of the cylinder in some cases.

SUMMARY OF THE INVENTION

It is therefore an object of the present invention to minimize aforementioned clamping peaks in the cylinder.

According to the invention, this object is met in that the tubular body has an elongation portion oriented in circumferential direction of the lateral surface of the cylinder.

By deliberately incorporating the elongation portion, the elongation behavior of the attachment part can be precisely adapted to the cylinder so that the negative influences of clamping peaks are minimized.

One possibility consists in that the elongation portion is formed by at least a partial diameter increase of the tubular body. In an arrangement of this kind, the tubular body no longer makes full-surface contact with the lateral surface of the cylinder. The diameter increase then acts like a spring which allows the tubular body to increase in diameter so that a uniform pre-loading is achieved on the cylinder.

One embodiment is characterized in that the diameter increase is formed by at least one axial bead in the tubular body. A bead can be formed in the tubular body in a very simple manner. Of course, a plurality of beads can also be formed in the tubular body.

In a further embodiment, the elongation portion is formed by a circumferential region with a cross section reduction of the tubular body. In the region of the cross section reduction, a greater elongation occurs compared to the standard cross section of the tubular body so that clamping peaks are also eliminated in the contacting region between the attachment part and cylinder.

It can be provided, for instance, that the cross section reduction is formed by a reduced wall thickness of the tubular body. In an attachment part constructed of sheet metal, Tailor rolled blanks which are already rolled in different wall thicknesses can be used, for example.

Alternatively, the cross section reduction may be formed by an edge web bordering an opening in the tubular body. In this case, the wall in the tubular body which can realize a greater elongation under a predetermined tensile force serves as residual cross section.

It has proven particularly advantageous when a first principal axis of the opening in circumferential direction of the tubular body is longer than a second principal axis of the opening in axial direction of the tubular body. The elongation direction is accordingly clearly defined.

The cross section reduction can also be formed by at least one edge cutout. A cutout of this kind can be produced particularly easily.

Especially good results are achieved in that the at least one edge cutout is formed so as to be offset in circumferential direction relative to the at least one opening in the tubular body. With this kind of combination of opening and cutout, webs are formed which extend obliquely relative to the circumferential direction resulting in particularly advantageous elongation behavior.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully below with reference to the drawings, in which.

DETAILED DESCRIPTION OF THE PRESENTLY PREFERRED EMBODIMENTS

Figure 1:
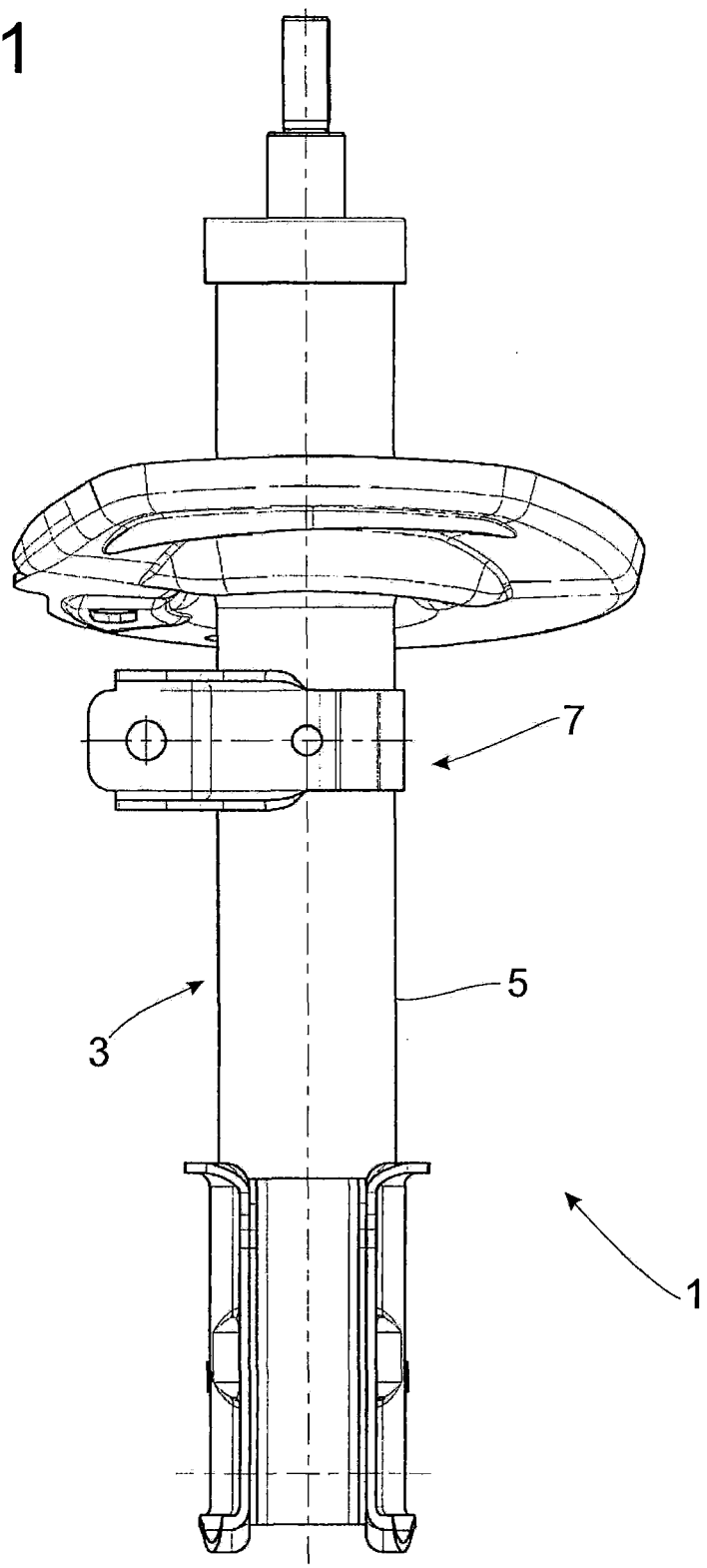
FIG. 1 is a side view of a section from a vibration damper with attachment part.

FIG. 1 shows a section from a vibration damper 1 comprising a cylinder 3, a clamp-shaped attachment part 7 being fastened to the outer lateral surface 5 thereof. The attachment part 7 according to FIGS. 2 to 4 has a tubular body 9 which is adjusted to the geometry of the lateral surface 5. The tubular body 9 is constructed as a sheet metal bending part having radial tabs 11; 13 at both of its ends. In order to apply pre-loading in circumferential direction of the tubular body by clamping devices, not shown, preferably clamping screws, the two tabs 11; 13 are spaced apart from one another at least slightly. The distance between the two tabs 11; 13 serves as a clamping path.

For absorbing an operating force, e.g., a supporting force for a stabilizer, the tabs 11; 13 and transitions from the tabs 11; 13 to the tubular body 9 are reinforced by angled edges 15; 17.

Figure 2:
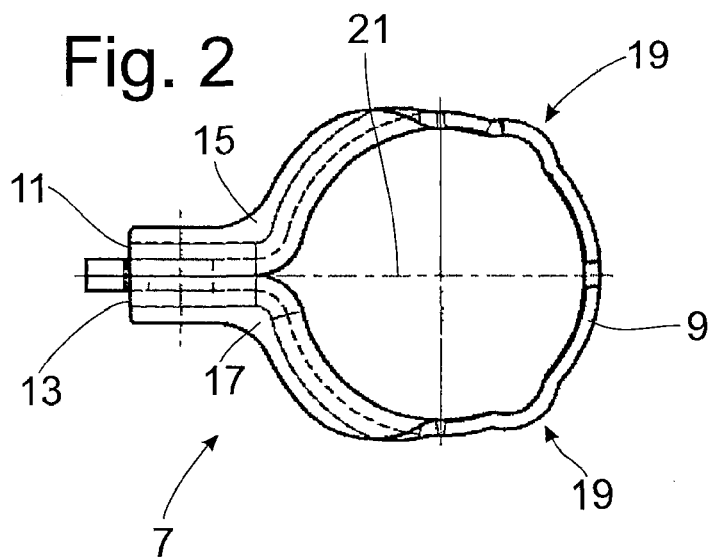
FIGS. 2 is a top view of the attachment part according to FIG. 1 as an individual component.
Figure 3:
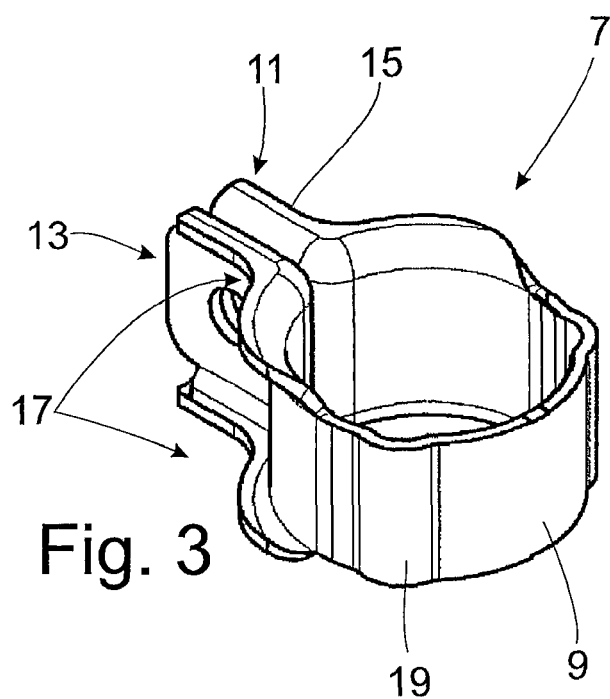
FIG. 3 is a perspective view of the attachment part according to FIG. 1 as an individual component.
Figure 4:
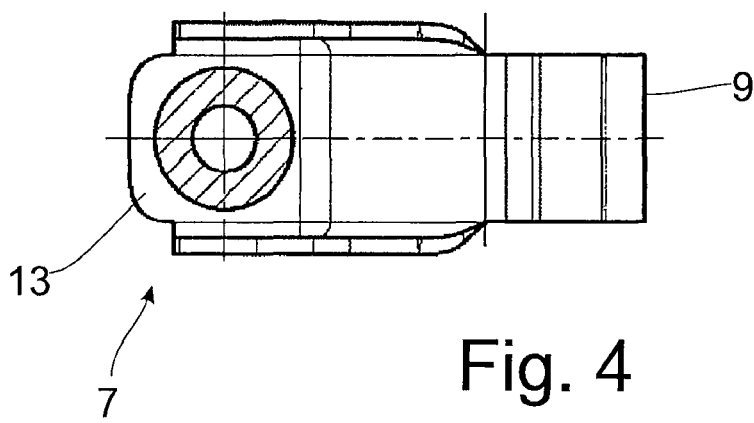
FIG. 4 is a side view of the attachment part according to FIG. 1 as an individual component.

With regard to a favorable transmission of pre-loading of the tubular body 9 to the cylinder 3, the tubular body 9 has elongation portions 19 oriented in circumferential direction of the lateral surface 5 of the cylinder 3. These elongation portions 19 are formed by at least a partial diameter increase 19 of the tubular body 9 in the constructional form of at least one axial bead. The bead can stretch or expand when the tubular body 9 is pre-loaded and acts as a strong spring so that the tubular body 9 contacts the cylinder 3 as uniformly as possible. The two FIGS. 2 and 3 show two beads which extend symmetric to the transverse axis 21 between the two tabs 11; 13. This results in a uniform elongation of the two halves of the tubular body.

Figure 5A:
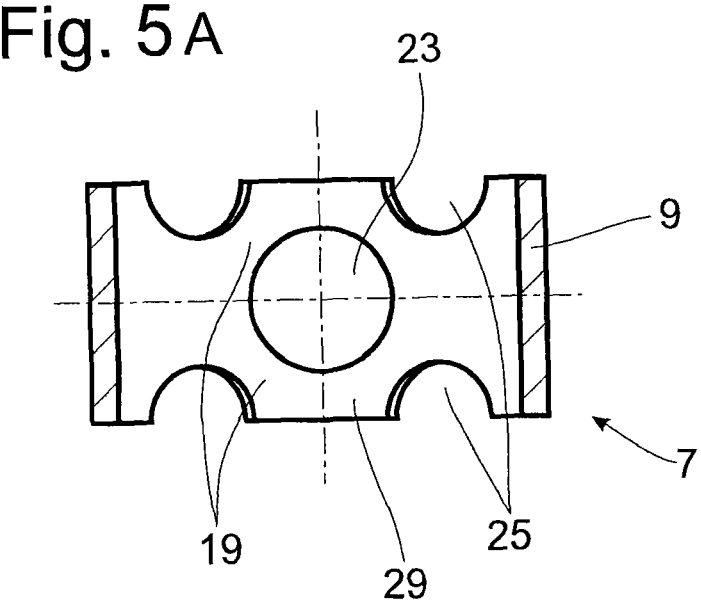
FIG. 5A is a cross-sectional view of another embodiment of the attachment part according to the present invention.
Figure 5B:
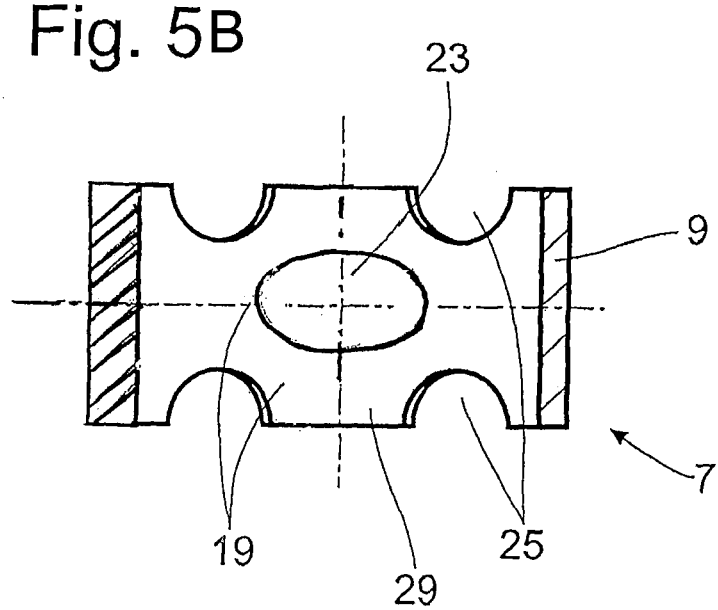
FIG. 5B is a cross-sectional view of yet another embodiment of the attachment part according to the present invention.
Figure 6:
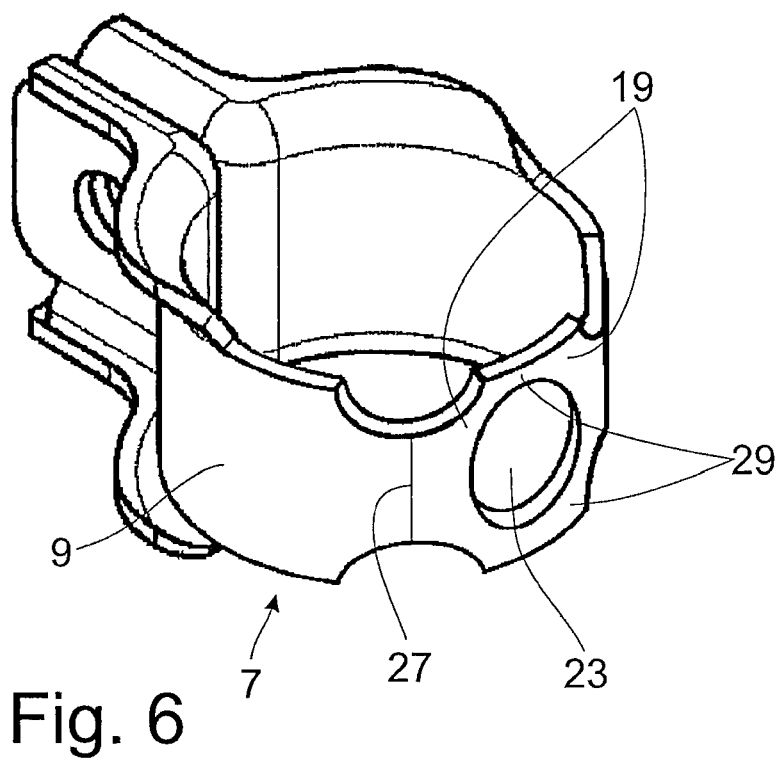
FIG. 6 is a perspective view of the embodiment of FIG. 5A in accordance with the invention.

FIGS. 5A, 5B and 6 show another embodiment in which the elongation portion 19 in the tubular body 9 is formed by a circumferential region with a cross section reduction. For one, it is possible to reduce the material thickness of the base material as shown at 9 in FIG. 5B.

FIGS. 5 and 6 show an opening 23 in the tubular body 9 which likewise forms a cross section reduction 19 which can elongate or stretch more easily compared to the solid material of the adjacent region. The opening 23 is circular in most drawings. However, it is also possible for the opening to be oval, for example, so that a first principal axis of the opening 23 in circumferential direction of the tubular body is longer than a second principal axis of the opening 23 in axial direction of the tubular body as shown in FIG. 5B.

The tubular body 9 further has at least one edge cutout 25. As a result of this combination of at least one edge cutout 25 which is formed so as to be offset in circumferential direction relative to the at least one opening 23 in the tubular body 9, webs which extend obliquely relative to the longitudinal axis of the tubular body 9 are formed as elongation portions 19. Cutouts 25 which are rounded proceeding from the two edges of the tubular body 9 are formed in the depicted embodiment. This results in necks 27 adjoining the opening 23 in circumferential direction. The cross section in the neck 27 substantially corresponds to the minimum cross section in the region of edge webs 29 defining the opening 23.

The oblique webs are characterized by a particularly advantageous stretching behavior in which the clearance cuts 23; 25 in the tubular body 9 facilitate the shaping of the webs. When the tubular body 9 is pre-loaded, the tubular body 9 can stretch in circumferential direction, and the openings 23 tend to assume an elliptical shape, i.e., the oblique webs incline more in circumferential direction and the distance in axial direction between the edge webs 29 decreases.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A vibration damper (1) comprising:
a cylinder (3) and a clamp-shaped attachment part (7) fastened to said cylinder (3); said attachment part (7) comprising a tubular body (9) contacting an outer lateral surface (5) of said cylinder (3) and a pair of spaced apart radial tabs (11; 13) extending from said tubular body (9) for introducing a pre-loading in a circumferential direction in the tubular body (9); and wherein said tubular body (9) has an elongation portion (19; 29) permitting stretching of said tubular body in a circumferential direction of said lateral surface (5) of said cylinder (3);
wherein said elongation portion (19) is formed by a cross section reduction of said tubular body (9);
wherein said tubular body has al least one opening therein and said cross section reduction is formed by an edge web (29) bordering said opening (23) in said tubular body (9);
wherein a second cross section reduction is formed by at least one edge cutout (25) in said tubular body (9); and
wherein said at least one edge cutout (25) is formed so as to be offset in circumferential direction relative to a closest opening of said at least on opening (23) in said tubular body (9).

2. The vibration damper according to claim 1, wherein said opening has a principal axis in a circumferential direction of said tubular body (9) and a principal axis in the axial direction of said tubular body (9) and wherein said principal axis of said opening (23) in circumferential direction is longer than said principal axis of said opening (23) in an axial direction.

* * * * *